(12) United States Patent
Mungre et al.

(10) Patent No.: US 11,321,461 B2
(45) Date of Patent: May 3, 2022

(54) MALWARE SCAN TASK PROCESSING IN A DATA STORAGE SYSTEM

(71) Applicant: EMC IP Holding Company LLC, Hopkinton, MA (US)

(72) Inventors: Avadut Mungre, North Goa (IN); Shiv Shankar Kumar, Pune (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 133 days.

(21) Appl. No.: 16/911,843

(22) Filed: Jun. 25, 2020

(65) Prior Publication Data
US 2021/0406371 A1 Dec. 30, 2021

(51) Int. Cl.
*G06F 21/56* (2013.01)
*G06F 21/78* (2013.01)
*G06F 21/62* (2013.01)
*G06F 16/182* (2019.01)

(52) U.S. Cl.
CPC .......... *G06F 21/565* (2013.01); *G06F 16/184* (2019.01); *G06F 21/564* (2013.01); *G06F 21/568* (2013.01); *G06F 21/6218* (2013.01); *G06F 21/78* (2013.01)

(58) Field of Classification Search
CPC .... G06F 21/565; G06F 16/184; G06F 21/564; G06F 21/568; G06F 21/6218; G06F 21/78; G06F 21/56; G06F 21/62; G06F 16/182
See application file for complete search history.

(56) References Cited

U.S. PATENT DOCUMENTS 9,940,460 B1 * 4/2018 Derbeko ............... G06F 21/568
2021/0182413 A1 * 6/2021 Agarwal ............. H04L 63/1433

* cited by examiner

*Primary Examiner* — Quazi Farooqui
(74) *Attorney, Agent, or Firm* — Amin, Turocy & Watson, LLP

(57) ABSTRACT

Malware scan task processing in a data storage system is described herein. A method as described herein can include designating, by a device operatively coupled to a processor, a file stored by a primary cluster of a data storage system for a malware scan; locating, by the device, a secondary cluster of the data storage system having stored thereon a copy of the file, the secondary cluster being distinct from the primary cluster; and, in response to determining that the file stored by the primary cluster matches the copy of the file stored by the secondary cluster, causing, by the device, a second anti-malware server associated with the secondary cluster to perform the malware scan for the copy of the file instead of a first anti-malware server associated with the primary cluster.

20 Claims, 14 Drawing Sheets

MALWARE SCAN TASK PROCESSING IN A DATA STORAGE SYSTEM

TECHNICAL FIELD

The subject application is related to data storage, and more particularly, to techniques for managing data security in a data storage system.

BACKGROUND

As computing technology has advanced over time, so too has the amount and scope of data that can be maintained and analyzed via computer systems. For instance, the ability to manage very large data sets, commonly known as big data, has led to significant advances in fields such as manufacturing, media, science, and e-commerce, among many others. Data storage systems, such as those utilized in network-attached storage (NAS) platforms, provide the means by which these large sets of data can be maintained in an efficient and reliable way.

In addition to providing a means for storing data, an NAS platform can implement one or more data security and/or protection techniques to ensure the integrity of data stored on the platform. For instance, an NAS platform can perform and/or manage scanning of respective files stored on the platform for viruses or other forms of malware according to one or more scanning policies.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an aspect, a data storage system is described herein. The data storage system can include a memory that stores executable components and a processor that executes the executable components stored in the memory. The executable components can include a file designation component that selects a file stored by a primary computing cluster of the data storage system for a malware scan, a cluster selection component that locates a copy of the file at a secondary computing cluster of the data storage system that is distinct from the primary computing cluster, and an archival management component that, in response to determining that the copy of the file as stored by the secondary computing cluster matches the file stored by the primary computing cluster, directs a second anti-malware server associated with the secondary computing cluster to perform the malware scan for the copy of the file instead of a first anti-malware server associated with the primary computing cluster.

In another aspect, a method is described herein. The method can include designating, by a device operatively coupled to a processor, a file stored by a primary cluster of a data storage system for a malware scan; locating, by the device, a secondary cluster of the data storage system having stored thereon a copy of the file, the secondary cluster being distinct from the primary cluster; and, in response to determining that the file stored by the primary cluster matches the copy of the file stored by the secondary cluster, causing, by the device, a second anti-malware server associated with the secondary cluster to perform the malware scan for the copy of the file instead of a first anti-malware server associated with the primary cluster.

In an additional aspect, a machine-readable medium including executable instructions is described herein. The instructions, when executed by a processor of a data storage system, can facilitate performance of operations including selecting a file stored at a primary site of a data storage system for a malware scan, identifying a secondary site of the data storage system that contains a copy of the file, and in response to determining that the file stored at the primary site matches the copy of the file stored by the secondary site, directing a second anti-malware server associated with the secondary site to perform the malware scan for the copy of the file instead of a first anti-malware server associated with the primary site.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

Figure 1:
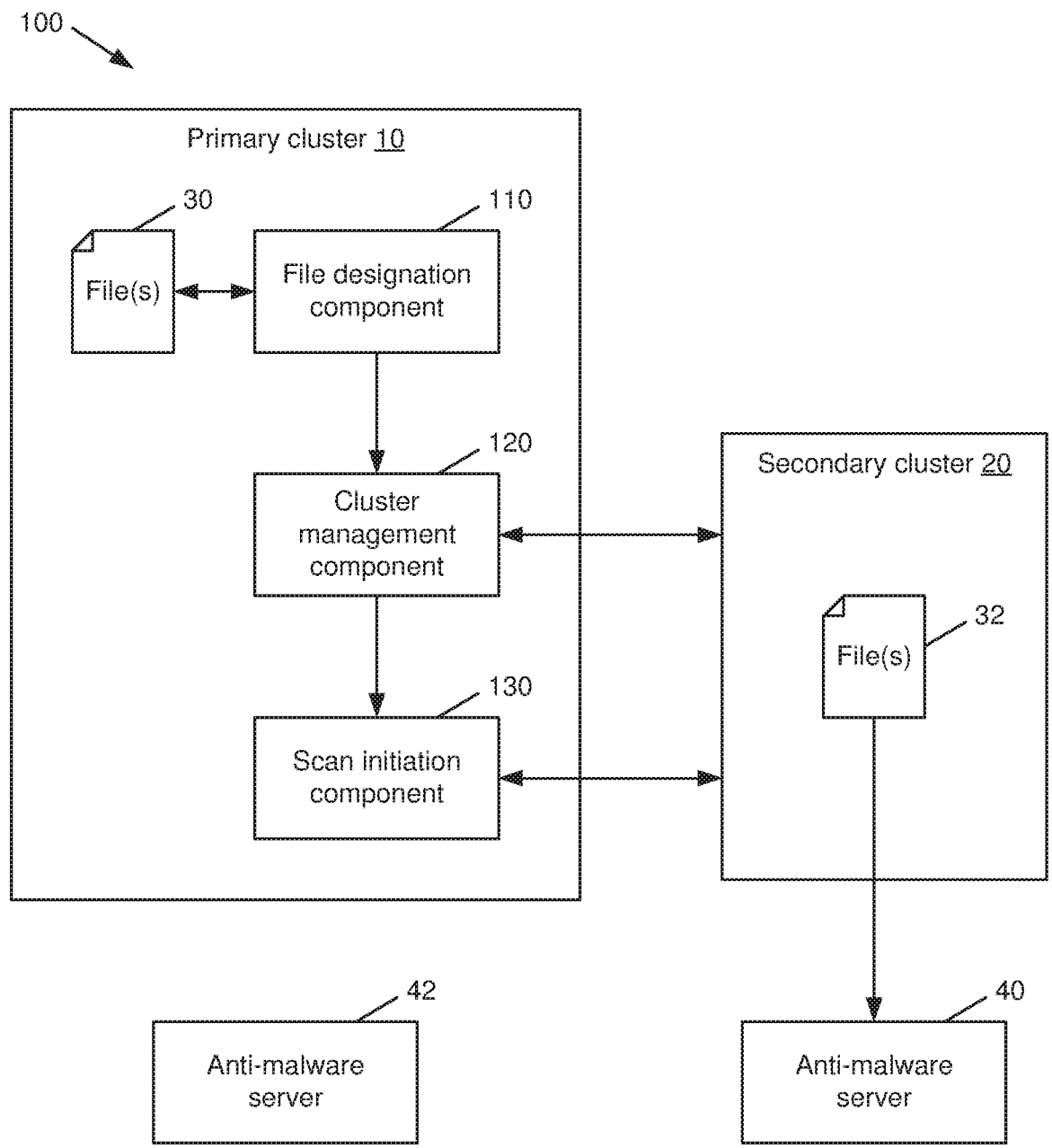
FIG. 1 is a block diagram of a system that facilitates malware scan task processing in a data storage system in accordance with various aspects described herein.

With reference now to the drawings, FIG. 1 illustrates a block diagram of a system 100 that facilitates malware scan task (job) processing in a data storage system in accordance with various aspects described herein. In an aspect, system 100 can utilize a replication facility for disaster recovery in order to enhance the security of data stored by system 100. For instance, system 100 as shown in FIG. 1 includes a primary storage cluster 10, referred to herein as simply a "primary cluster," and one or more secondary storage clusters 20, referred to herein as simply "secondary clusters." While only one secondary cluster 20 is illustrated in FIG. 1, it should be appreciated that system 100 can include any suitable number of secondary clusters 20.

In an aspect, recurring replication jobs can be defined via replication policies on the primary cluster 10 to replicate stored data to the secondary cluster(s) 20. While the primary cluster 10 and secondary cluster 20 are shown in FIG. 1 as being distinct entities, e.g., associated with different computing sites, it should be appreciated that respective clusters associated with a data storage system can be hosted within a same site, distributed among several sites, and/or configured in any other suitable manner Data replication from a primary cluster 10 to a secondary cluster 20 is described in further detail below with respect to FIG. 2.

In addition to replication, the primary cluster 10 as shown in system 100 can be tasked with serving client input/output (I/O) requests. While the primary cluster 10 actively serves I/O requests, the secondary cluster 20 can remain idle, e.g., to await any failure conditions on the primary cluster 10 in order to become active.

Moreover, the primary cluster 10 can execute antivirus and/or other anti-malware scans, e.g., periodically and/or according to one or more scan policies, to maintain the integrity and security of system 100 and the files stored by system 100. However, these malware scan jobs can consume resources of the primary cluster 10, e.g., in terms of power consumption, processor cycles, network bandwidth, etc. For instance, the primary cluster 10 can consume resources associated with determining which files to scan, etc., as well as network bandwidth associated with coordinating scans of designated files with an anti-malware server or other suitable scanning subsystem. This, in turn, can reduce the performance of the primary cluster 10 and adversely impact client I/O requests.

In an aspect, system 100 can reduce the impact of malware scan jobs on the performance of the primary cluster 10 as noted above by offloading scanning operations to one or more associated secondary clusters 20 under various conditions. Since the secondary cluster(s) 20 associated with the primary cluster 10 would otherwise be idle awaiting a failover event from the primary cluster 10, these operations can be shifted to the secondary cluster(s) 20 with minimal impact on overall system performance. As a result, the primary cluster 10 can assign more of its resources to serve client I/O requests while utilizing the computing capacity of secondary cluster(s) 20 to achieve file scanning. Accordingly, various embodiments as described herein provide advantages that improve the functionality of the primary cluster 10 in terms of resource utilization, e.g., in terms of processor cycles, memory usage, power consumption, network bandwidth, etc. Other advantages of the embodiments described herein can also be realized.

As shown by FIG. 1, system 100 can achieve the foregoing and/or related ends via a file designation component 110, a cluster management component 120, and an scan initiation component 130, each of which are described in further detail below. While the components 110, 120, 130 are each shown in FIG. 1 as being associated with a single primary cluster 10, it should be appreciated that the components 110, 120, 130 could be implemented in any suitable manner across any number of computing devices or clusters. Also or alternatively, the operations described below with respect to each of the individual components 110, 120, 130 could themselves be distributed over one or more computing devices or clusters, e.g., such that the functionality of a single component is distributed across multiple computing devices or clusters. Other implementations are also possible.

In an aspect, the file designation component 110 of system 100 can select a file 30 that is stored by the primary cluster 10 of system 100 for a malware scan, such as an antivirus scan and/or any other suitable scan operation(s). The file designation component 110 can select files for malware scans based on a scan policy for system 100. In one example, a scan policy that can be utilized by system 100 can provide for scanning of respective files at regular intervals, e.g., according to scheduled scan jobs. In another example, a scan policy associated with system 100 can be a scan-on-read or scan-on-write policy and/or otherwise provide for scanning of respective files according to various trigger conditions. Other scan policies could also be used.

As further shown in FIG. 1, system 100 includes a cluster management component 120 that can identify a secondary cluster 20 that contains a copy 32 of a file 30 as selected by the file designation component 110 as described above. In an aspect, the cluster management component 120 can identify a secondary cluster 20 that contains a copy 32 of a designated file 30 based on file attributes and/or other information that are maintained in the course of replicating the file 30 to the secondary cluster 20, as will be described below with respect to FIGS. 2-4.

System 100 as shown by FIG. 1 additionally includes a scan initiation component 130 that, in response to determining that the copy 32 of the file 30 as stored by the secondary cluster 20 matches the file 30 as stored by the primary cluster 10, directs an anti-malware server 40 associated with the secondary cluster 20 to perform a malware scan for the copy 32 of the file 30 instead of a distinct anti-malware server 42 associated with the primary cluster 10. In an aspect, the primary cluster 10 can utilize checksum information and/or other data relating to the designated file 30 as provided by the secondary cluster 20 to determine whether the copy 32 of the file 30 at the secondary cluster 20 matches the file 30 at the primary cluster 10, e.g., as described in further detail below with respect to FIGS. 8-9.

Figure 2:
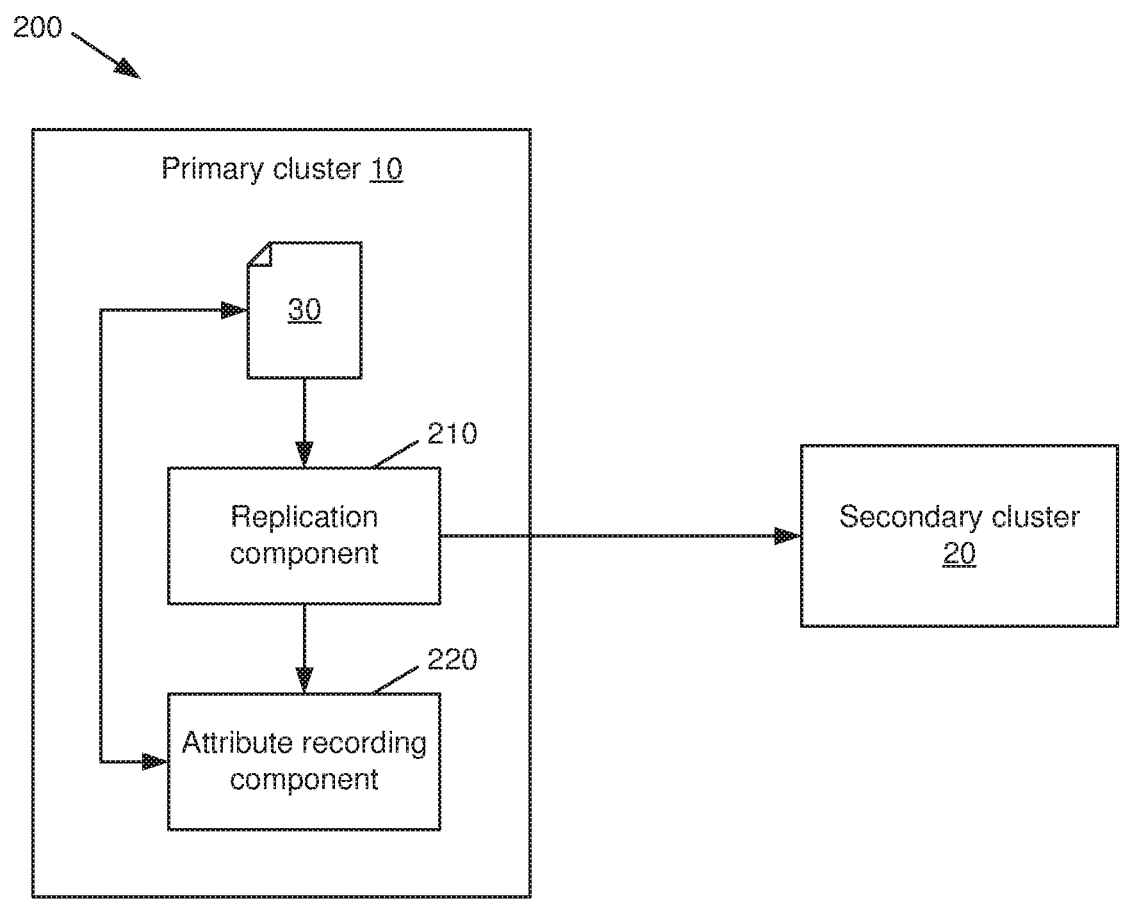
FIG. 2 is a block diagram of a system that facilitates data replication from a primary cluster to a secondary cluster in accordance with various aspects described herein.

Turning now to FIG. 2, a block diagram of a system 200 that facilitates data replication from a primary cluster 10 to a secondary cluster 20 in accordance with various aspects described herein is illustrated. Repetitive description of like elements employed in other embodiments described herein is omitted for brevity. As shown by FIG. 2, system 200 includes a replication component 210 that can replicate respective files 30 stored by the primary cluster 10 to one or more secondary clusters 20, e.g., resulting in copies 32 of the files 30 (not shown in FIG. 2) being stored at the secondary cluster(s) 20. In an aspect, data replication from the primary cluster 10 to a secondary cluster 20 can occur regularly, e.g., according to a schedule, and/or in response to various conditions as defined by a replication policy and/or by other means. In another aspect, replication of data from the primary cluster 10 to a secondary cluster 20 can occur in any suitable manner, e.g., according to one or more replication techniques known in the art.

As further shown in FIG. 2, the primary cluster 10 of system 200 can further include an attribute recording component 220 that can record an identity of the secondary cluster 20, e.g., in an attribute of the file 30 as stored on the primary cluster 10, in response to the replication component 210 successfully replicating the file 30 to the secondary cluster 20. In an aspect, the attribute recording component 220 can record information relating to the replication status of respective files 30 stored by the primary cluster 10 as extended attributes of the respective files. For instance, attributes that can be managed by the attribute recording component 220 can include a replication state attribute that indicates whether the associated file has been replicated, e.g., since a last write operation on the file, as well as a replication target attribute that records a value and/or other information relating to a secondary cluster 20 to which the file 30 was replicated. The replication target attribute can contain, e.g., an internet protocol (IP) address, a domain name, and/or other identifier(s) corresponding to an associated secondary cluster 20. In some examples, the replication target attribute can indicate a single secondary cluster 20 or multiple secondary clusters 20, e.g., in the case of a file 30 that is replicated to multiple distinct secondary clusters 20.

Figure 3:
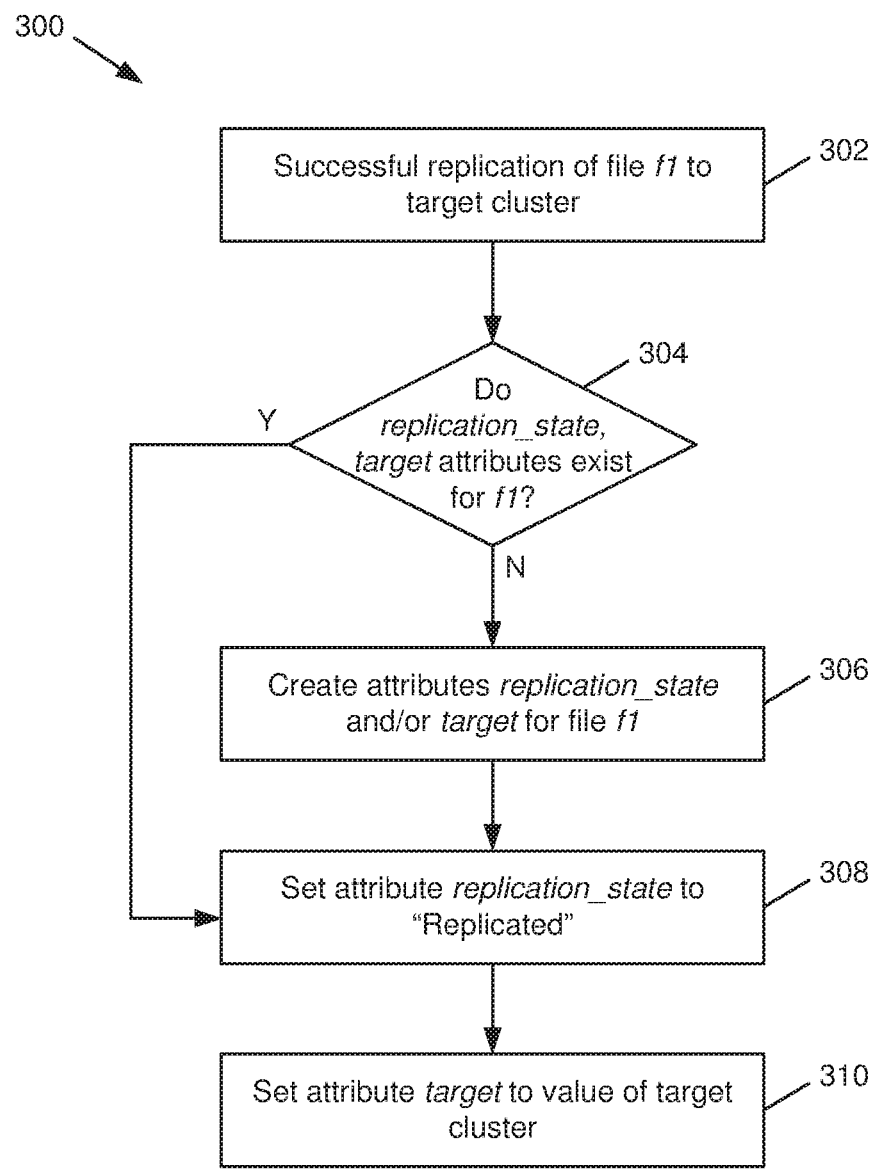
FIGS. 3-4 are flow diagrams of respective methods for maintaining replication state and location information for a file in accordance with various aspects described herein.
Figure 4:
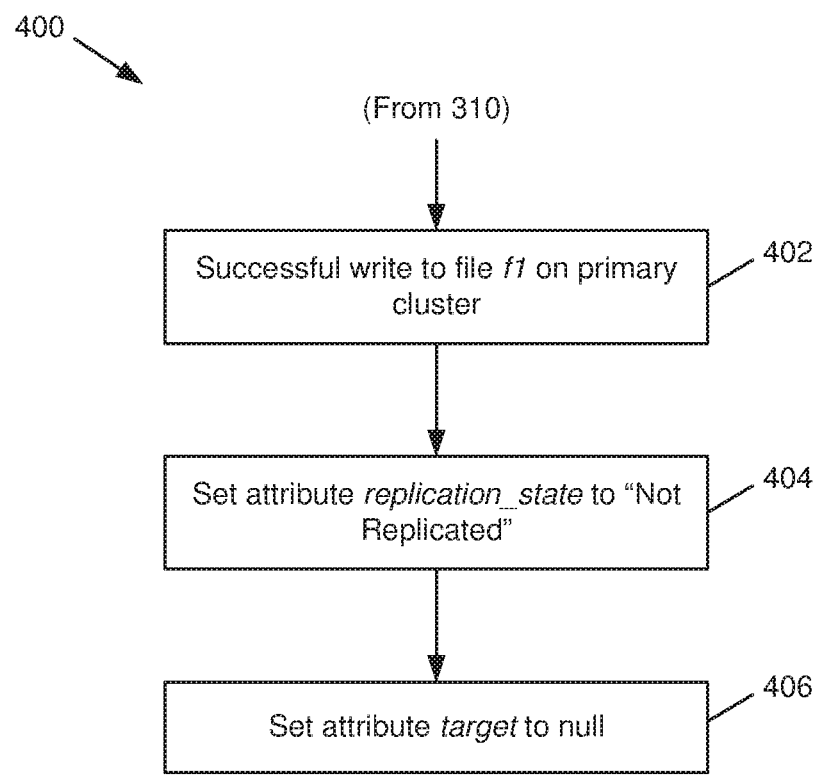

Turning to FIGS. 3-4 and with further reference to FIG. 2, respective methods that can be utilized, e.g., by the attribute recording component 220, to maintain file attributes as described above are illustrated. Referring first to FIG. 3, a method 300 for recording attribute information associated with successful replication of a file can be initiated at 302 upon a given file, referred to here as f1, being successfully replicated to a target cluster.

Upon the successful replication of file f1 at 302, method 300 can proceed to 304, where it is determined whether the extended file attributes as described above, including a replication_state attribute and a target attribute, exist for file f1. If said attributes do not exist for file f1, method 300 can proceed from 304 to 306, in which the relevant missing attribute(s) can be created.

Upon creating the attributes at 306, or in response to determining at 304 that the attributes exist for file f1, method 300 can continue to 308, in which the attribute replication_state for file f1 is set to a value of "Replicated." Method 300 can then conclude at 310, in which the attribute target for file f1 is set to the value of the target cluster, e.g., in the manner described above with respect to FIG. 2.

In an aspect, the operations shown in method 300 can be performed for respective files that are replicated, e.g., via a replication task and/or by other means. For instance, method 300 can be performed after each successful replication job completion on the primary cluster 10 for each file associated with the replication job.

Turning next to FIG. 4, a method 400 for adjusting the attributes of a file f1 in response to a write operation on the file f1 is illustrated. For purposes of this description, it is assumed that file f1 contains the replication_state and target attributes associated with a prior replication of f1, e.g., as described above with respect to method 300. It should be appreciated, however, that said attributes could be created for file f1 in a similar manner to that described above with respect to method 300 if the attributes are missing from file f1.

As shown in FIG. 4, method 400 can begin at 402 in response to a successful write to file f1 on the primary cluster. Because the contents of file f1 are altered as a result of a successful write, any previously replicated copies of file f1 would not match file f1 as it exists on the primary cluster after the write and therefore are no longer valid. As a result, at 404, the attribute replication_state of file f1 can be set to "Not Replicated." Similarly, at 406, the attribute target of file f1 can be set to a null value.

In an aspect, the operations shown in method 400 can be performed in response to each successful write operation for files stored on the primary cluster. Upon subsequent replication of one or more files stored on the primary cluster to other clusters, the relevant file attributes can be updated accordingly, e.g., according to method 300 as described above.

Figure 5:
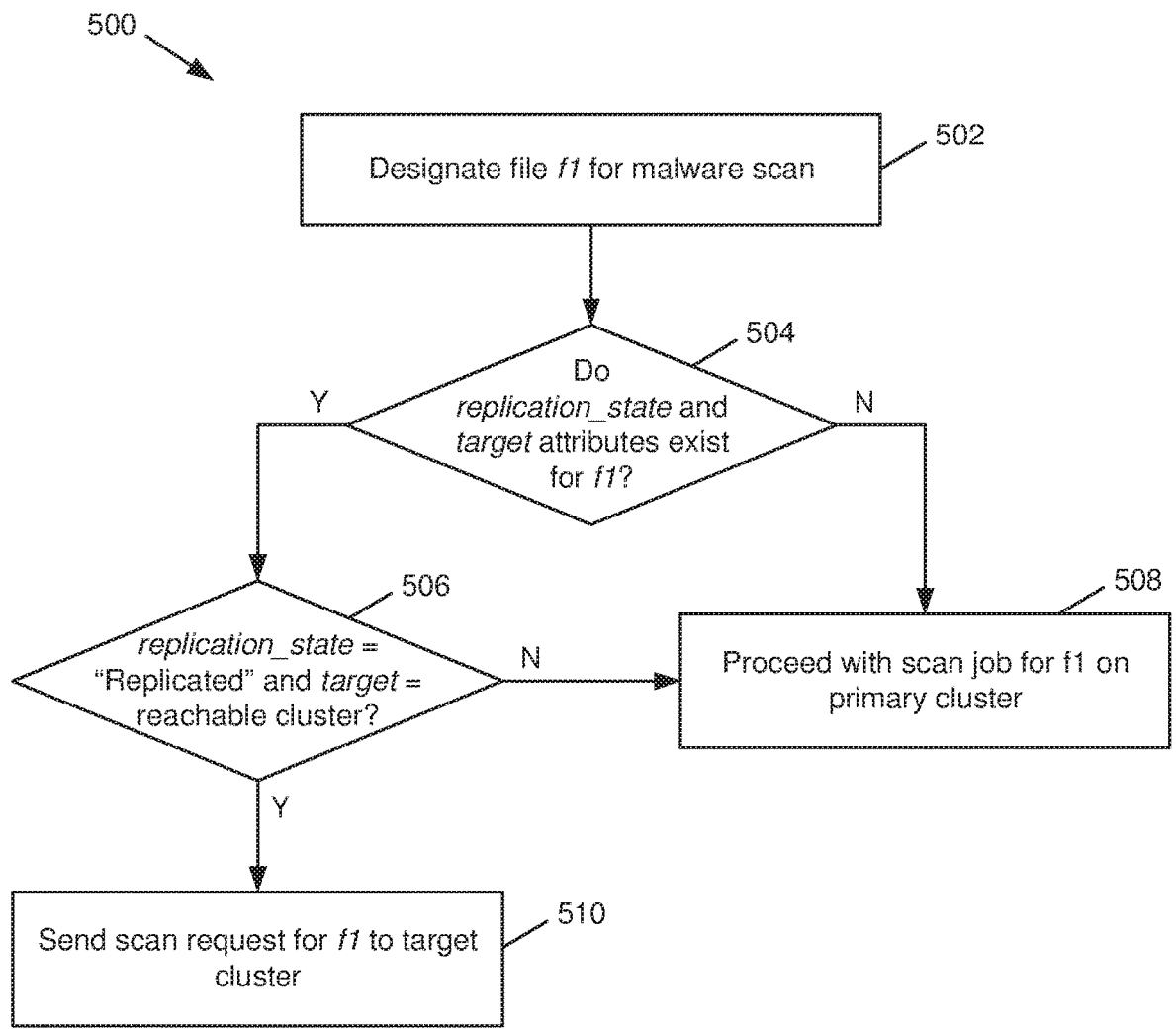
FIG. 5 is a flow diagram of a method for directing a secondary cluster to perform a malware scan job in accordance with various aspects described herein.

Turning to FIG. 5, and with reference again to FIG. 1, a flow diagram of a method 500 for directing a secondary cluster 20 to perform a malware scan job in accordance with various aspects described herein is illustrated. Method 500 as illustrated by FIG. 5 begins at 502, in which a file f1 is designated (e.g., by the file designation component 110) for a malware scan.

At 504, it is determined, e.g., by the cluster management component 120, whether replication_state and target attributes exist for file f1. In an aspect, these attributes can be applied to a file and/or otherwise managed by an attribute recording component 220 as shown in FIG. 2, e.g., according to the operations described above with respect to FIGS. 3-4. If said attributes exist for file f1, the cluster management component 120 can further determine at 506 whether the replication_state attribute for file f1 has a value of "Replicated" and the target attribute for file f1 indicates a reachable secondary cluster 20 in the system.

Figure 6:
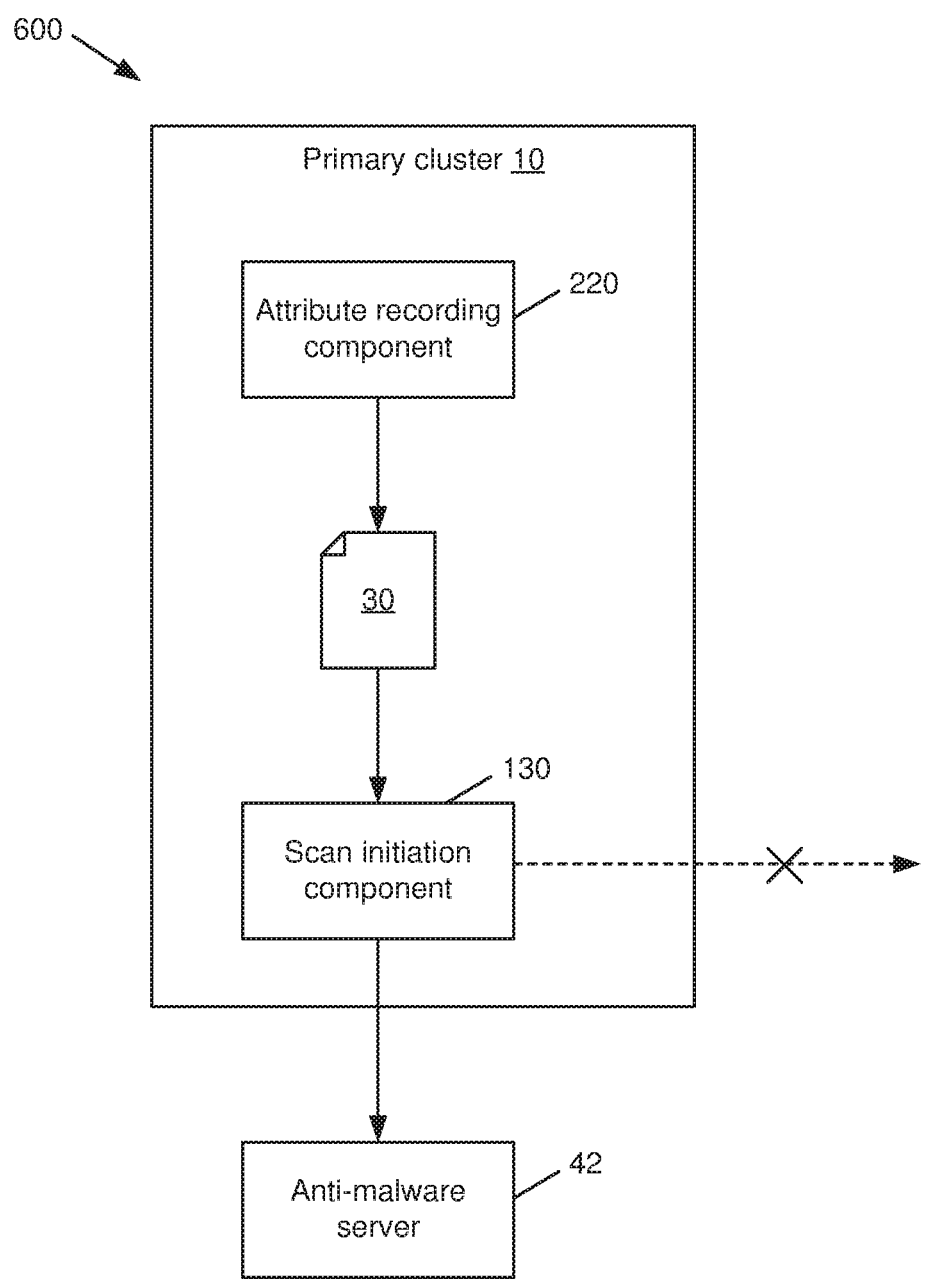
FIG. 6 is a block diagram of a system that facilitates conditional malware scan initiation from a primary cluster of a data storage system in accordance with various aspects described herein.

If it is determined by the cluster management component 120 at 504 that the replication_state and target attributes do not exist for file f1, or if it is determined at 506 that said attributes do not indicate that file f1 has been replicated to a reachable secondary cluster 20, method 500 can conclude at 508, in which the malware scan job for file f1 is performed locally at the primary cluster 10. An example of this condition is illustrated by system 600 in FIG. 6. As shown in system 600, in the event that a secondary cluster containing a current copy of the file 30 to be scanned cannot be found, the scan initiation component 130 can instead initiate a malware scan of the file 30 by an anti-malware server 42 for the primary cluster 10.

Alternatively, if the attributes of file f1 are determined at 504 and 506 to indicate that a valid secondary cluster 20 contains a current copy of file f1, method 500 can conclude at 510, in which the scan initiation component 130 submits a request to the secondary cluster 20 indicated by the target attribute of file f1 to initiate the malware scan at an anti-malware server 40 associated with the secondary cluster 20, e.g., as shown in FIG. 1.

In an aspect, method 500 can be performed in response to a malware scan job being initiated, e.g., according to a schedule set by a scan policy. Additionally, a malware scan job can specify multiple files for scanning. For instance, a malware scan job can be set for all files at a particular location, e.g., a cluster, volume, directory, or the like. Also or alternatively, a malware scan job can specify files for scanning according to file types and/or other file characteristics. By way of non-limiting example, a malware scan job can be initiated to scan all document files (e.g., files with extensions .doc, .pdf, or the like) on a given client's home directory. Other groupings of files could also be specified.

In the event that a malware scan job specifies multiple files for scanning as described above, method 500 can be performed for each designated file for the scan job. In an aspect, the file designation component 110 can respond to a malware scan job being initiated by compiling and/or otherwise obtaining a list of the respective files to be scanned per the associated scan policy. Subsequently, the file designation component 110 can designate respective files in the list at 502 for further processing via method 500, e.g., until the list of files associated with the scan job has been exhausted.

Figure 7:
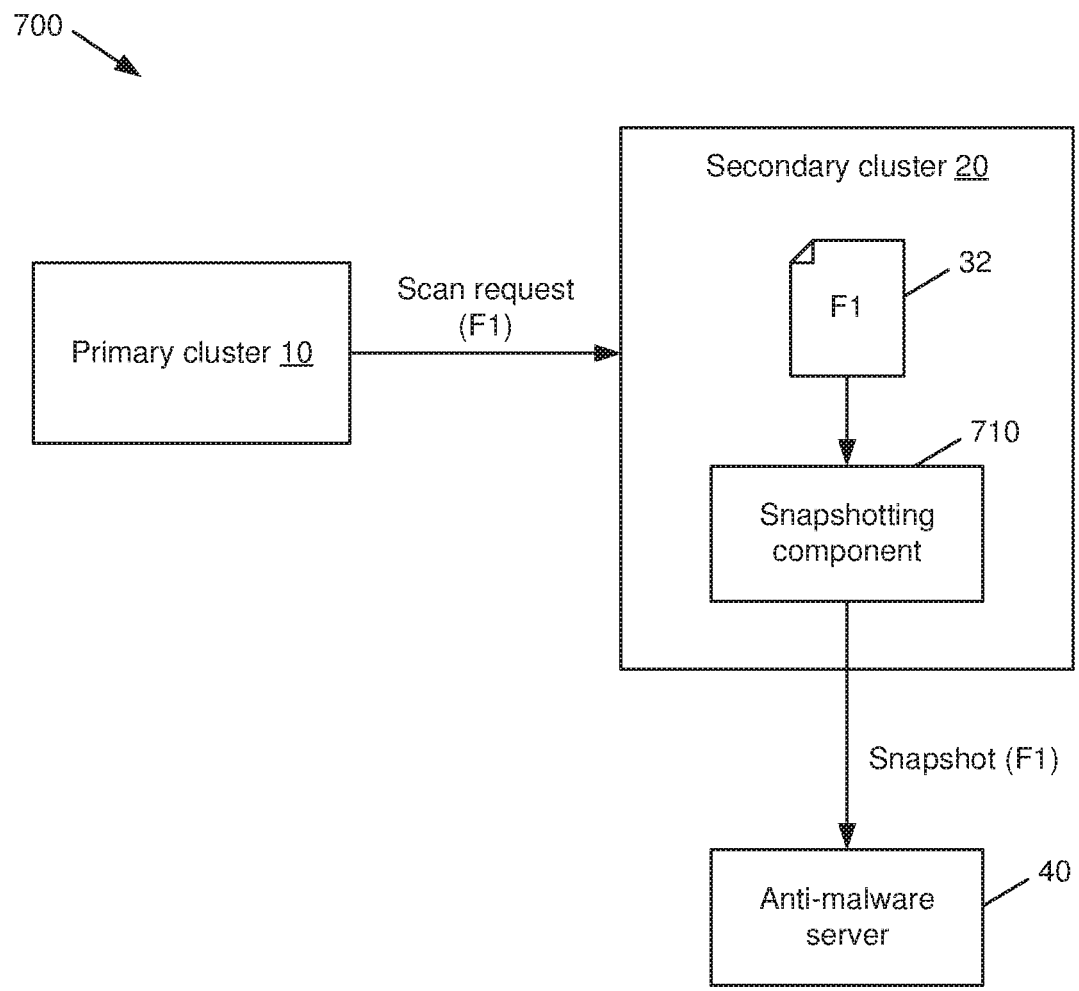
FIGS. 7-8 are block diagrams of respective systems that facilitate conducting a malware scan at a secondary cluster in accordance with various aspects described herein.

With reference next to FIG. 7, a block diagram of a system 700 that facilitates conducting a malware scan at a secondary cluster 20 in accordance with various aspects described herein is illustrated. Repetitive description of like elements employed in other embodiments described herein is omitted for brevity. In an aspect, in response to determining that a current copy 32 of a file 30 (not shown in FIG. 7) resides on a reachable secondary cluster 20, the primary cluster 10 can send a request to the secondary cluster 20 to scan the file copy 32 as stored on the secondary cluster 20, e.g., as described above with respect to FIG. 5. For clarity of illustration, the file copy 32 is labeled as F1 in FIG. 7 as well as in FIGS. 8-9, which will be described in further detail below.

In another aspect, in response to receiving the scan request from the primary cluster 10, the secondary cluster 20 can start a scan process for the file copy 32 using similar processes to those that would be used if the scan was being performed at the primary cluster 10. More particularly, the secondary cluster 20 can begin the scan process by taking a snapshot of the file copy 32 via a snapshotting component 710. The snapshot of the file copy 32 can be, e.g., a full representation of the file copy 32 as it existed at the time the request from the primary cluster 10 was received. Alternatively, the snapshot can be a compressed version of the file copy 32 and/or a partial representation of the file copy 32.

Once a snapshot of the file copy 32 has been generated by the snapshotting component 710, the secondary cluster 20 can send a scan request for the snapshot to an anti-malware server 40 that is associated with the secondary cluster 20. In an aspect, the scan request can include the snapshot of the file copy 32, or alternatively the scan request can specify a location of the snapshot on the secondary cluster 20, e.g., such that the anti-malware server 40 can access the snapshot from the secondary cluster 20 for the scan.

Figure 8:
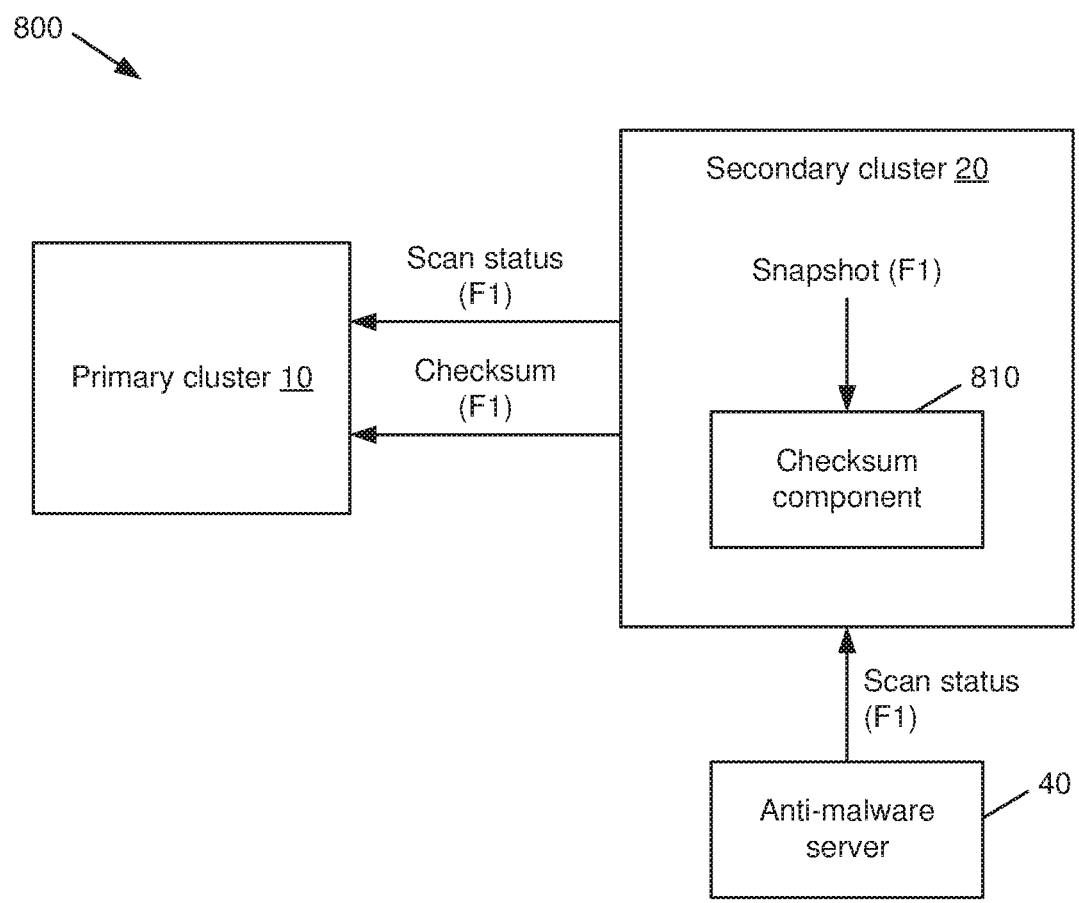

Next, as further illustrated by system 800 in FIG. 8, the anti-malware server 40 for the secondary cluster 20 can perform the requested scan and return a result of the scan back to the secondary cluster 20. Because files replicated to the secondary cluster 20 are read-only, the secondary cluster 20 does not perform any actions on the file copy 32 as recommended by the anti-malware server 40 in its scan result. Instead, the secondary cluster 20 can relay the result of the scan of the file copy 32 back to the primary cluster 10 for further processing. In addition, the secondary cluster can calculate a checksum of the file copy 32, e.g., via a checksum component 810, and provide the checksum for the file copy 32 to the primary cluster 10 along with the scan status.

In an aspect, if the scan for the file copy 32 fails, anti-malware scanning is not configured on the secondary cluster 20, and/or other factors prevent the scan of the file copy 32 from completing, the secondary cluster 20 can report the status of the scan as "Failed" back to the primary cluster 10. Additionally, the secondary cluster can delete the snapshot of the file copy 32 after the scan for the file copy 32 has been completed and reported to the primary cluster 10.

Figure 9:
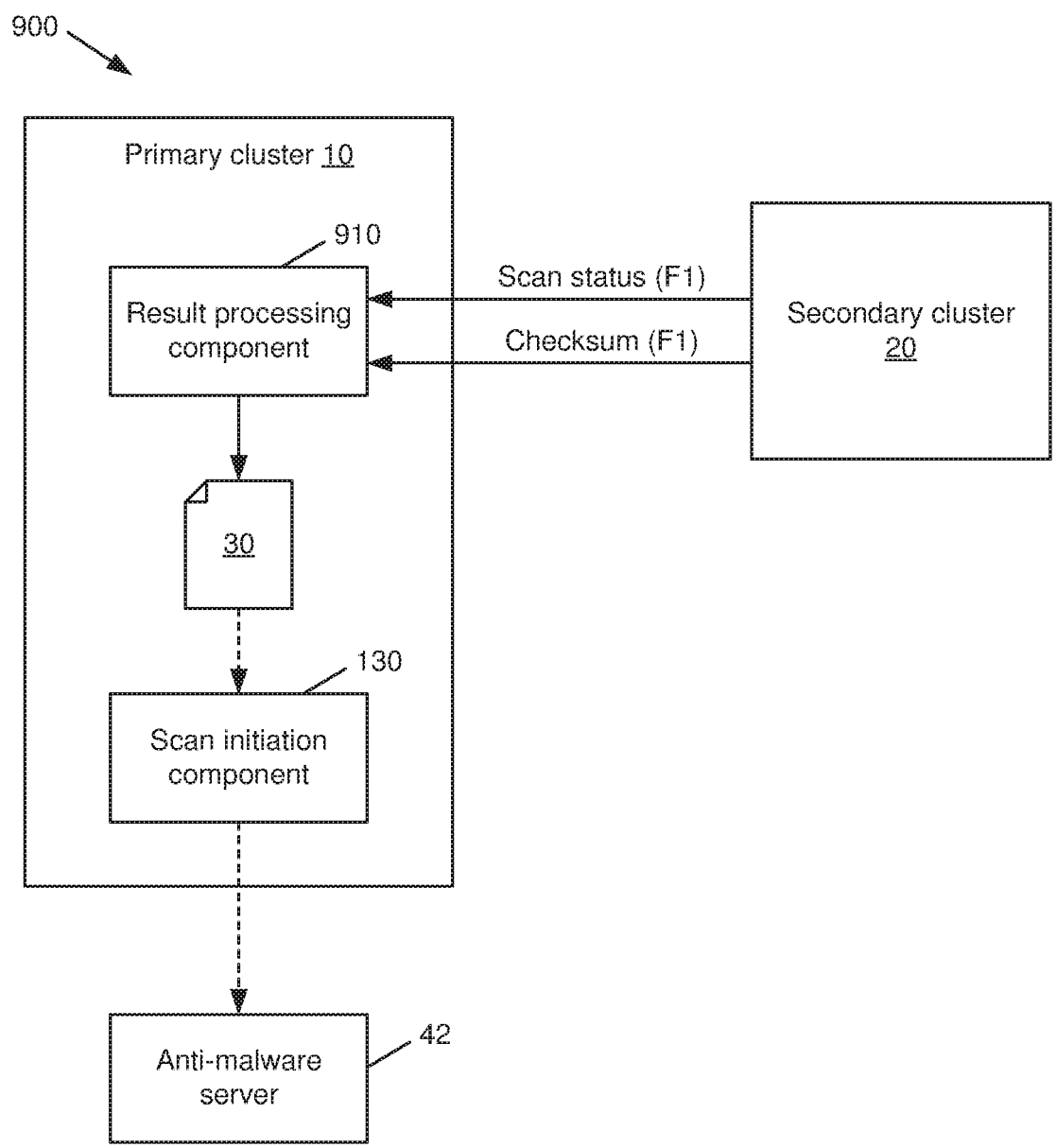
FIG. 9 is a block diagram of a system that facilitates processing a malware scan task result obtained from a secondary cluster in accordance with various aspects described herein.

Turning now to FIG. 9, a block diagram of a system 900 that facilitates processing a malware scan task result obtained from a secondary cluster 20 in accordance with various aspects described herein is illustrated. Repetitive description of like elements employed in other embodiments described herein is omitted for brevity. As shown in FIG. 9, a secondary cluster 20 can return a scan response, including a scan status and a file checksum, to the primary cluster 10 (e.g., as described above with respect to FIGS. 7-8) in response to a scan request submitted by the primary cluster 10. In an aspect, a result processing component 910 at the primary cluster 10 can obtain the response from the secondary cluster 20 and apply the scan result provided in the response to the target file 30 at the primary cluster, e.g., upon satisfaction of respective conditions as will be described below.

Figure 10:
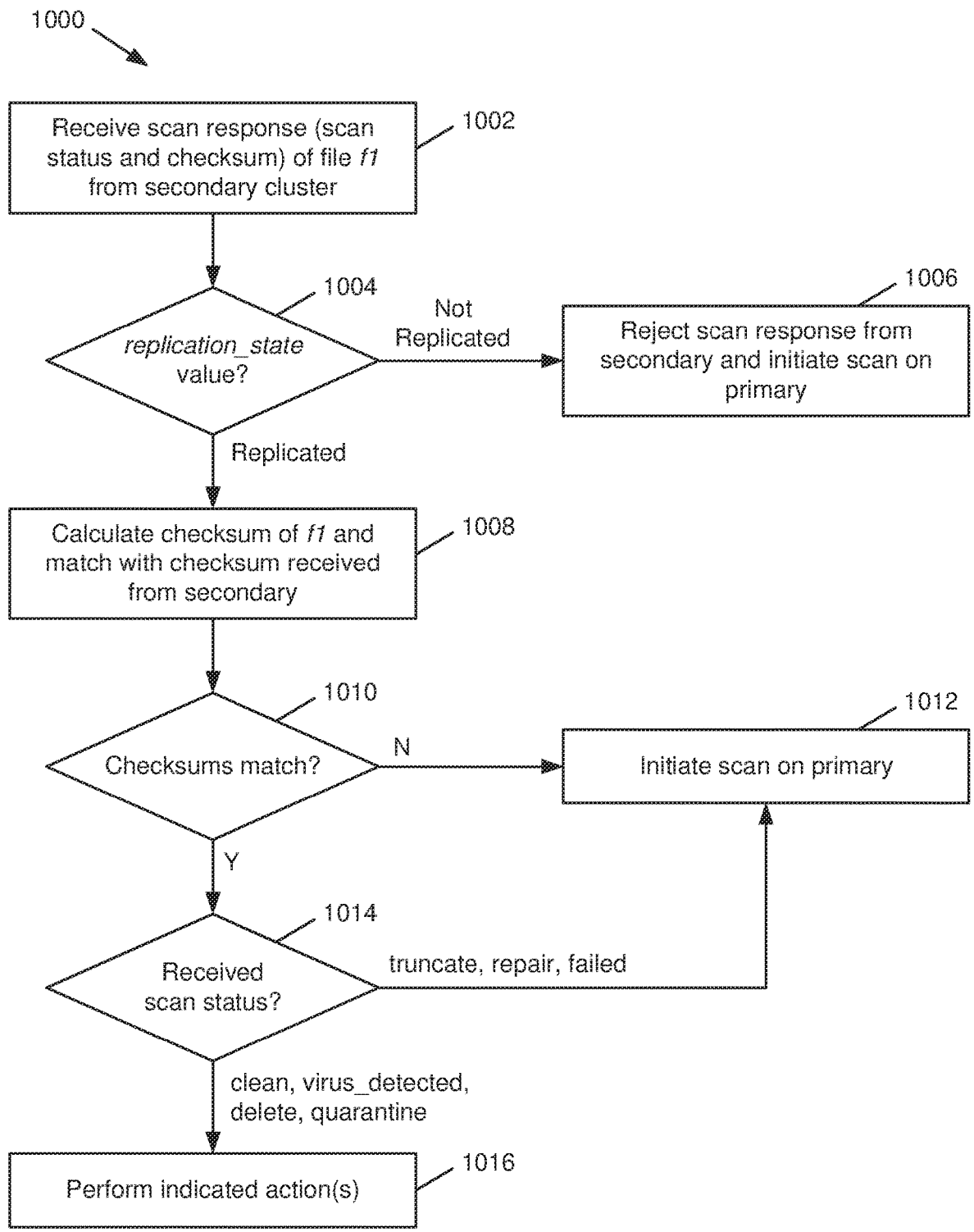
FIG. 10 is a flow diagram of a method for managing a malware scan result obtained from a secondary cluster in accordance with various aspects described herein.

In an aspect, actions that can be taken by the result processing component 910 in response to receiving a scan result from the designated secondary cluster 20 are illustrated by method 1000 in FIG. 10. It should be appreciated, however, that method 1000 is merely one example of operations that could be performed by the result processing component 910 and that other operations could also be used.

Method 1000 as shown in FIG. 10 can begin at 1002, wherein the result processing component 910 receives a scan response, e.g., including a scan result and a file checksum for a file f1, from the secondary cluster 20 as described above. Next, at 1004, the result processing component 910 can check the replication_state attribute of file f1. If the value of the replication_state attribute is "Not Replicated" at 1004, the result processing component can infer that file f1 has changed on the primary cluster 10 subsequent to submitting the scan request for file f1 to the secondary cluster 20. As a result, method 1000 can conclude at 1006, wherein the result processing component 910 can reject the scan response received from the secondary cluster 20 and instead initiate a scan for file f1 from the primary cluster 10 via an anti-malware server 42 for the primary cluster, e.g., as shown in FIG. 9 via dashed lines.

If the replication_state attribute of file f1 is determined to have a value of "Replicated" at 1004, method 1000 can instead proceed to 1008, wherein the primary cluster 10 can calculate a checksum for file f1 as it exists on the primary cluster and compare this calculated checksum to the checksum returned from the secondary cluster 20 in the scan response received at 1002. In an aspect, a checksum for file f1 can be calculated at 1008 via the result processing component 910 and/or one or more other components of the primary cluster 10, such as a checksum component (not shown in FIG. 9) that is similar to the checksum component 810 of the secondary cluster 20 as described above with respect to FIG. 8.

At 1010, the result processing component can then determine whether the checksum for file f1 as calculated at 1008 matches the checksum received from the secondary cluster 20 at 1002. If these checksums do not match, e.g., due to a write to file f1 occurring on the primary cluster 10 after the scan request for f1 was sent and before the corresponding scan response was received, method 1000 can then conclude at 1012 by initiating a second anti-malware scan for file f1 at the primary cluster 10, e.g., in a similar manner to that described above at 1006.

If both checksums are determined to be a match at 1010, method 1000 can further proceed to 1014, wherein the operation of method 1000 can further branch based on the scan result received from the secondary cluster 20 in its scan response. As described above with respect to FIG. 8, because files as stored on the secondary cluster 20 are configured to be read-only once replicated to the secondary cluster 20, the secondary cluster 20 is not capable of performing revisions on local file copies. Instead, as noted above, the secondary cluster 20 can pass along any revisions suggested by its anti-malware server 40 to the primary cluster 10 in its scan response.

Further to the above, if the scan response received from the secondary cluster 20 includes a suggestion to revise file f1, e.g., by truncating or repairing the file, the scan response received from the secondary cluster 20 may in some cases provide incomplete information to enable the primary cluster 10 to make the recommended revisions to file f1. As such, in the event that the scan response received at 1002 includes a scan status of "truncate," "repair," or the like, method 1000 can proceed from 1014 to 1012, wherein the primary cluster 10 can initiate a second malware scan for file f1 at its anti-malware server 42, e.g., as described above. In doing so, the anti-malware server 42 associated with the primary cluster 10 can confirm the recommendation of the anti-malware server 40 for the secondary cluster 20 and either perform the recommended revisions itself, e.g., via write access to file f1 on the primary cluster 10, and/or provide the primary cluster 10 with more complete information to implement the recommended revisions. Method 1000 can similarly proceed from 1014 to 1012 in the event that the scan response received at 1002 indicates that the scan at the secondary cluster 20 failed and/or the scan response is otherwise insufficient to enable the primary cluster 10 to perform suitable actions on file f1.

Alternatively, if the received scan status for file f1 is deemed at 1014 to enable appropriate action(s) to be performed for file f1 without supplemental information, method 1000 can conclude at 1016 to take said action(s). By way of example, if the received scan status for file f1 indicates that either file f1 is clean or a virus was detected in file f1, the scan status of file f1 on the primary cluster 10 can be updated to reflect the received status. As another example, the primary cluster 10 can delete file f1 at 1016 if the received scan status indicates that file f1 should be deleted. As a further example, if the received scan status indicates that file f1 should be quarantined, file f1 can be moved at 1016 to a quarantine folder, and permissions for file f1 can be set to disable client access to the file, e.g., either individually for file f1 or indirectly based on permissions assigned to the quarantine folder. Other actions, including actions not shown in FIG. 10, could also be performed at 1016.

Figure 11:
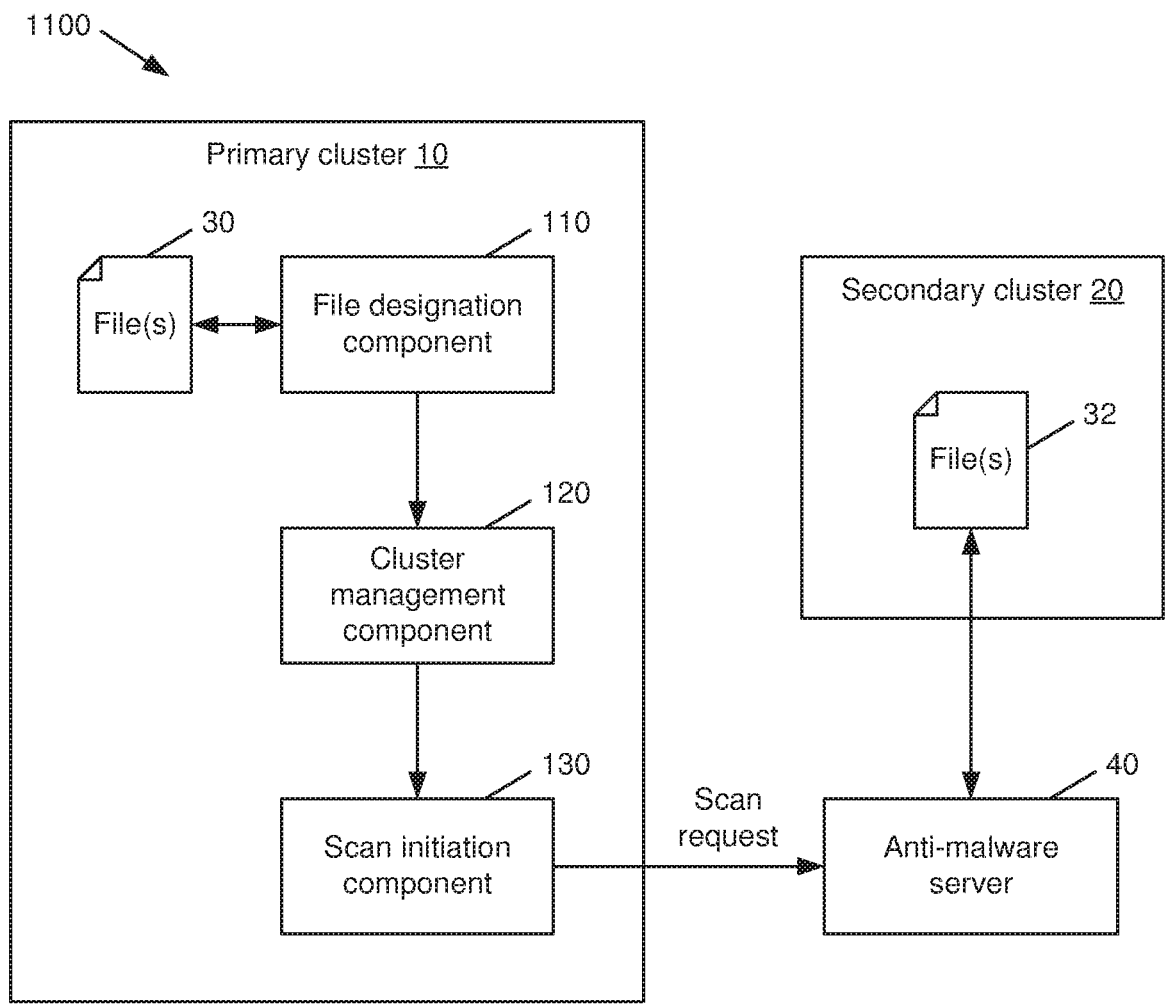
FIG. 11 is a block diagram of a system that facilitates initiating an on-demand malware scan at an anti-malware server for a secondary cluster in accordance with various aspects described herein.

With reference next to FIG. 11, a block diagram of a system 1100 that facilitates initiating an on-demand malware scan at an anti-malware server 40 for a secondary cluster 20 in accordance with various aspects described herein is illustrated. Repetitive description of like elements employed in other embodiments described herein is omitted for brevity. In an aspect, system 1100 as shown in FIG. 11 can function as a data storage system with a primary cluster 10 and at least one secondary cluster 20 that can function in a similar manner to that described above with respect to FIG. 1. Further, the primary cluster 10 of system 1100 as shown in FIG. 11 can include a file designation component 110 and a cluster management component 120 that function similarly to the corresponding components of system 100 as described above.

In contrast to the various embodiments described above (e.g., with respect to system 100) that operate on the basis of a scheduled malware scan task, system 1100 in FIG. 11 illustrates adaptations that can be utilized to extend those embodiments to improve the efficiency of on-demand malware scans, e.g., scans conducted according to a scan-on-read policy.

In an aspect, the file designation component 110 in system 1100 can designate a given file 30 for a malware scan, e.g., in response to a read request being received for the file 30 from a client and an antivirus daemon and/or other mechanisms determining that the file is to be scanned (e.g., per a scan-on-read policy) before read access to the file 30 can be granted. Accordingly, to reduce the amount of time associated with performing the scan at a secondary cluster 20 identified by the cluster management component 120 as described above, the scan initiation component 130 shown in system 1100 can direct an anti-malware server 40 for the secondary cluster 20 to scan a copy 32 of the file 30 as stored on the secondary cluster 20 by submitting a request directly to the anti-malware server 40 for the secondary cluster 20, e.g., instead of the secondary cluster 20 itself.

In another aspect, a scan request sent from the scan initiation component 130 to the anti-malware server 40 for the secondary cluster 20 can include an IP address and/or other information corresponding to the secondary cluster 20 in order to enable the anti-malware server 40 to read the copy 32 of the file 30 as stored on the secondary cluster 20 instead of the file 30 as stored on the primary cluster 10. Directing the anti-malware server 40 to read the copy 32 of the file 30 on the secondary cluster 20 can conserve I/O resources of the primary cluster 10. Further, in a scenario in which the primary cluster 10 is in a different geographical area than the secondary cluster 20 and its associated anti-malware server 40, directing the anti-malware server 40 to read the copy 32 of the file 30 on the secondary cluster 20 can result in faster access times due to reduced network travel time.

In response to receiving a scan request from the scan initiation component 130 of the primary cluster 10, the anti-malware server 40 for the secondary cluster 20 can locate the secondary cluster 20 based on the identifying information provided in the scan request. Subsequently, the anti-malware server 40 can scan the copy 32 of the file 30 residing on the secondary cluster 20 by reading the copy 32 of the file 30 from the secondary cluster 20, e.g., according to read permissions pre-assigned to the anti-malware server 40 by the secondary cluster 20 without further intervention from the secondary cluster 20.

Figure 12:
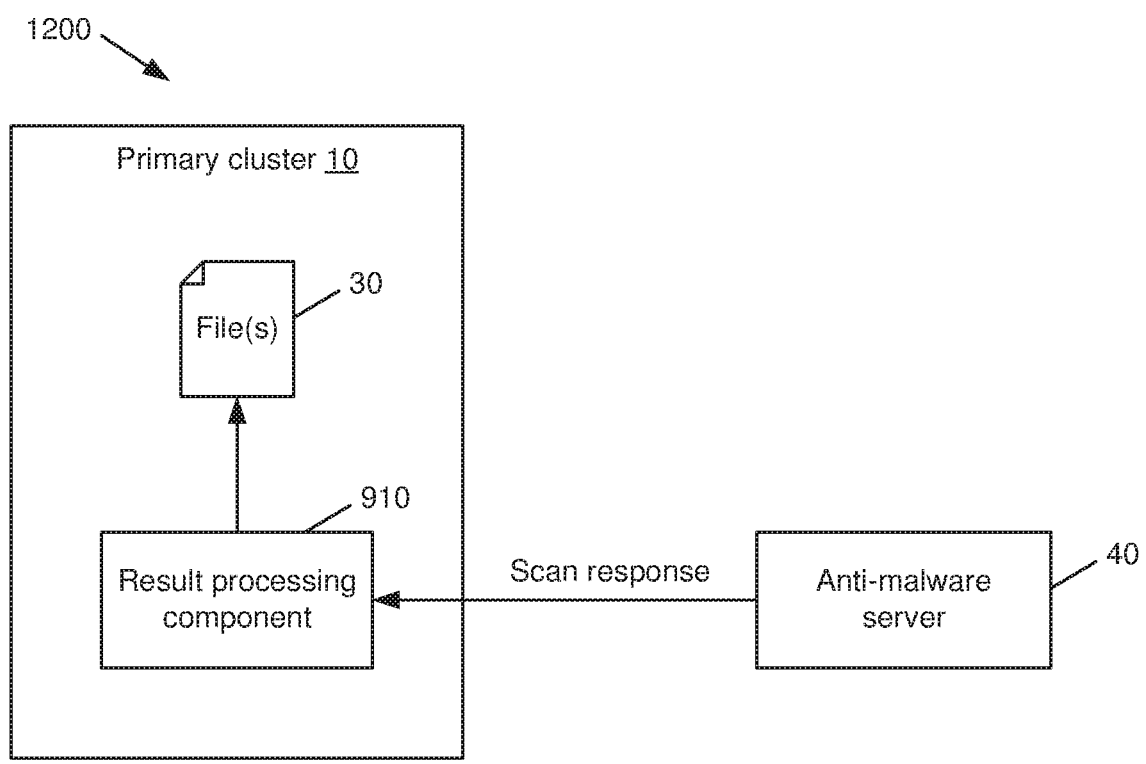
FIG. 12 is a block diagram of a system that facilitates processing a malware scan result obtained by an anti-malware server for a secondary cluster in accordance with various aspects described herein.

Once the anti-malware server 40 successfully scans the copy 32 of the file 30 on the secondary cluster 20, the anti-malware server 40 can return a result of the scan in a scan response message to the primary cluster, e.g., as shown by system 1200 in FIG. 12. As further shown by FIG. 12, a result processing component 910 at the primary cluster 10 can obtain the malware scan result for the copy 32 of the file 30 from the anti-malware server 40 and apply the malware scan result to the file 30 as stored on the primary cluster 10. In an aspect, because the primary cluster 10 directly communicates with the anti-malware server 40 for the secondary cluster 20 in this embodiment, the result processing component 910 can obtain full information regarding recommended actions to the file 30, including recommended revisions to the file 30, without initiating a separate local malware scan for the file 30, e.g., as performed in the examples given above.

Figure 13:
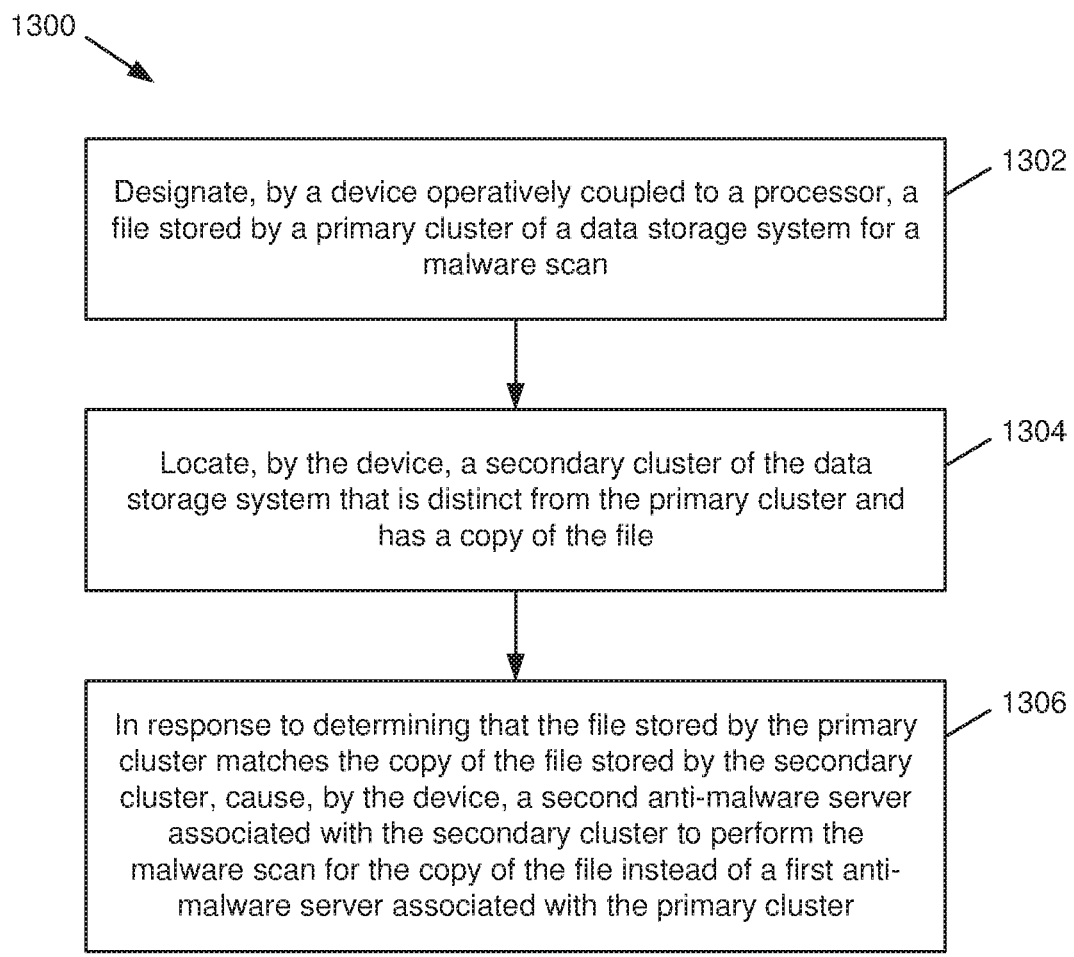
FIG. 13 is a flow diagram of a method that facilitates malware scan task processing in a data storage system in accordance with various aspects described herein.

Referring next to FIG. 13, a flow diagram of a method 1300 that facilitates malware scan task processing in a data storage system in accordance with various aspects described herein is illustrated. At 1302, a device operatively coupled to a processor can designate (e.g., by a file designation component 110) a file (e.g., a file 30) stored by a primary cluster of a data storage system (e.g., a primary cluster 10) for a malware scan.

At 1204, the device can locate (e.g., by a cluster management component 120) a secondary cluster of the data storage system (e.g., a secondary cluster 20) that is distinct from the primary cluster and that contains a copy of the file designated at 1102 (e.g., a copy 32 of the file 30).

At 1206, in response to determining that the file stored by the primary cluster matches the copy of the file stored by the secondary cluster, the device can cause (e.g., by an scan initiation component 130) a second anti-malware server (e.g., an anti-malware server 40) associated with the secondary cluster to perform the malware scan instead of a first anti-malware server (e.g., an anti-malware server 42) associated with the primary cluster.

FIGS. 3-5, 10, and 13 as described above illustrate methods in accordance with certain aspects of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 14:
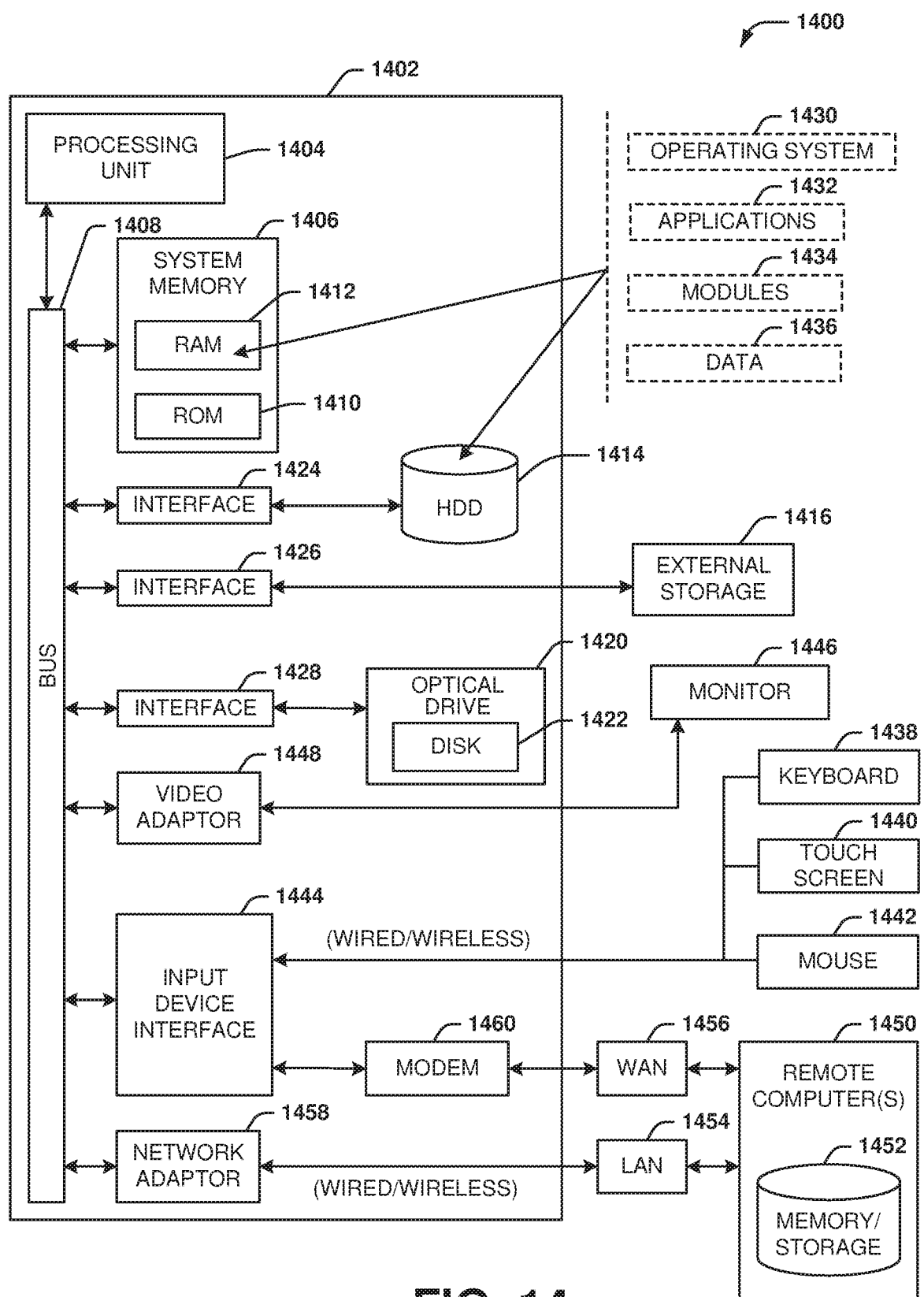
FIG. 14 is a diagram of an example computing environment in which various embodiments described herein can function.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD), a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enable with a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A data storage system, comprising:
   a memory that stores computer executable components; and
   a processor that executes computer executable components stored in the memory, wherein the computer executable components comprise:
   a file designation component that selects a file stored by a primary computing cluster of the data storage system for a malware scan;
   a cluster management component that identifies a secondary computing cluster of the data storage system having a copy of the file, wherein the secondary computing cluster is distinct from the primary computing cluster; and
   a scan initiation component that, in response to determining that the copy of the file as stored by the secondary computing cluster matches the file as stored by the primary computing cluster, directs a second anti-malware server associated with the secondary computing cluster to perform the malware scan for the copy of the file instead of a first anti-malware server associated with the primary computing cluster.

2. The data storage system of claim 1, wherein the scan initiation component directs the second anti-malware server to perform the malware scan for the copy of the file by submitting a request to the secondary computing cluster to initiate the malware scan at the second anti-malware server.

3. The data storage system of claim 2, wherein the computer executable components further comprise:

a result processing component that obtains a malware scan result for the copy of the file from the secondary computing cluster in response to the request and applies the malware scan result to the file as stored by the primary computing cluster.

4. The data storage system of claim 3, wherein the malware scan is a first malware scan, and wherein the scan initiation component causes the first anti-malware server to perform a second malware scan for the file as stored by the primary computing cluster in response to the malware scan result for the first malware scan including a recommendation to revise the file.

5. The data storage system of claim 1, wherein the scan initiation component directs the second anti-malware server to perform the malware scan for the copy of the file by submitting a request to the second anti-malware server to scan the copy of the file as stored by the secondary computing cluster.

6. The data storage system of claim 5, wherein the scan initiation component submits the request to the second anti-malware server in response to a read request being received for the file as stored by the primary computing cluster.

7. The data storage system of claim 6, wherein the computer executable components further comprise:
a result processing component that obtains a malware scan result for the copy of the file from the second anti-malware server in response to the request and applies the malware scan result to the file as stored by the primary computing cluster.

8. The data storage system of claim 1, wherein the computer executable components further comprise:
a replication component that replicates the file from the primary computing cluster to the secondary computing cluster, resulting in the copy of the file being stored at the secondary computing cluster.

9. The data storage system of claim 8, wherein the computer executable components further comprise:
an attribute recording component that records an identity of the secondary computing cluster in an attribute of the file as stored on the primary computing cluster in response to the replication component successfully replicating the file to the secondary computing cluster.

10. The data storage system of claim 9, wherein the file is a first file, wherein the malware scan is a first malware scan, and wherein the scan initiation component initiates a second malware scan of a second file stored by the primary computing cluster by the first anti-malware server in response to the attribute of the second file indicating that the second file has not been replicated.

11. A method, comprising:
designating, by a device operatively coupled to a processor, a file stored by a primary cluster of a data storage system for a malware scan;
locating, by the device, a secondary cluster of the data storage system having stored thereon a copy of the file, the secondary cluster being distinct from the primary cluster; and
in response to determining that the file stored by the primary cluster matches the copy of the file stored by the secondary cluster, causing, by the device, a second anti-malware server associated with the secondary cluster to perform the malware scan for the copy of the file instead of a first anti-malware server associated with the primary cluster.

12. The method of claim 11, wherein the causing the second anti-malware server to perform the malware scan comprises submitting a request to the secondary cluster to initiate the malware scan at the second anti-malware server.

13. The method of claim 12, further comprising:
receiving, by the device, a malware scan result for the copy of the file from the secondary cluster in response to the request; and
applying, by the device, the malware scan result to the file as stored by the primary cluster.

14. The method of claim 13, wherein the malware scan is a first malware scan, and wherein the method further comprises:
causing, by the device, the first anti-malware server to perform a second malware scan for the file as stored by the primary cluster in response to the malware scan result for the first malware scan including a recommendation to revise the file.

15. The method of claim 11, wherein the causing the second anti-malware server to perform the malware scan comprises submitting a request to the second anti-malware server to scan the copy of the file as stored by the secondary cluster.

16. The method of claim 15, wherein the causing the second anti-malware server to perform the malware scan further comprises submitting the request to the second anti-malware server in response to a read request being received for the file at the primary cluster.

17. A non-transitory machine-readable medium comprising computer executable instructions that, when executed by a processor of a data storage system, facilitate performance of operations, the operations comprising:
selecting a file stored at a primary site of the data storage system for a malware scan;
identifying a secondary site of the data storage system that contains a copy of the file; and
in response to determining that the file stored at the primary site matches the copy of the file stored by the secondary site, directing a second anti-malware server associated with the secondary site to perform the malware scan for the copy of the file instead of a first anti-malware server associated with the primary site.

18. The non-transitory machine-readable medium of claim 17, wherein the operations further comprise:
transmitting a request to the secondary site to initiate the malware scan at the second anti-malware server;
receiving a malware scan result for the copy of the file from the secondary site in response to the request; and
applying the malware scan result to the file as stored at the primary site.

19. The non-transitory machine-readable medium of claim 18, wherein the malware scan is a first malware scan, and wherein the operations further comprise:
directing the first anti-malware server to perform a second malware scan for the file as stored at the primary site in response to the malware scan result for the first malware scan recommending a revision to the file.

20. The non-transitory machine-readable medium of claim 17, wherein the operations further comprise:
transmitting a request to the second anti-malware server to scan the copy of the file as stored at the secondary site in response to a read request being received for the file at the primary site.

* * * * *